United States Patent [19]
Yoshida et al.

[11] Patent Number: 5,450,237
[45] Date of Patent: Sep. 12, 1995

[54] HYPERRESOLUTION OPTICAL SYSTEM

[75] Inventors: Toshihiko Yoshida; Osamu Yamamoto; Saburo Yamamoto, all of Nara; Shohichi Kato, Yamatokoriyama; Masumi Nakamichi, Tenri; Toshimasa Hamada, Kashihara; Sadayoshi Matsui, Tenri, all of Japan

[73] Assignee: Sharp Kabushiki Kaisha, Osaka, Japan

[21] Appl. No.: 300,070

[22] Filed: Sep. 2, 1994

Related U.S. Application Data

[63] Continuation of Ser. No. 922,871, Jul. 31, 1992, abandoned.

[30] Foreign Application Priority Data

Sep. 11, 1991 [JP] Japan .................. 3-231976

[51] Int. Cl.[6] ............................. G02B 27/46
[52] U.S. Cl. ........................ 359/562; 359/558; 369/44.12; 369/112
[58] Field of Search .............. 385/14, 131; 359/15, 359/558, 562; 369/44.12, 112

[56] References Cited

U.S. PATENT DOCUMENTS

| | | | |
|---|---|---|---|
| 4,861,128 | 8/1989 | Ishikawa et al. | 385/131 |
| 4,937,808 | 6/1990 | Shimada et al. | 369/112 |
| 5,025,438 | 6/1991 | Emoto | 369/112 |
| 5,121,378 | 6/1992 | Hirose et al. | 369/112 |
| 5,191,624 | 3/1993 | Ito et al. | 385/7 |
| 5,206,852 | 4/1993 | Kim et al. | 369/112 |
| 5,231,624 | 7/1993 | Finegan | 369/118 |
| 5,349,592 | 9/1994 | Andó | 369/112 |

FOREIGN PATENT DOCUMENTS

| | | | |
|---|---|---|---|
| 0346844 | 12/1989 | European Pat. Off. | 369/112 |
| 0411525 | 2/1991 | European Pat. Off. | G11B 7/26 |
| 3269835 | 12/1991 | Japan | 369/44.12 |
| 4-78042 | 3/1992 | Japan | 369/112 |
| 6-12697 | 1/1994 | Japan | 369/44.12 |

OTHER PUBLICATIONS

Hiroyuki, H., *Patent Abstracts of Japan* (4 Nov. 1987) vol. 11, No. 335 (P-632).
Hirose et al., *Extended Abstracts* (*The 49th Autumn Meeting, 1988*) The Japan Society of Applied Physics, No. 3, p. 838, 4a-ZD-6.
Yamanaka et al., *Extended Abstracts* (*The 49th Autumn Meeting, 1988*) The Japan Society of Applied Physics, No. 3, p. 838, 4a-ZD-7.
Kojima, T., "Aspherical plastic singlets for optical disc use" *Ohyo Butsuri* (1988) 57(5):762–764.
Shigeru et al., *Patent Abstracts of Japan* (29 Mar. 1987) vol. 15, No. 131, (P-1186). The corresponding Japanese Patent Publication No. 3-15003 is also enclosed.
Yamanaka et al., "High density recording by superresolution in an optical disk memory system" *Applied Optics* (1990) 29(20):3046–3051.
Tetsuya et al., *Patent Abstracts of Japan* (25 Sep. 1990) vol. 14, No. 445, (P-1110). The corresponding Japanese Patent Publication No. 2-177026 is also enclosed.

*Primary Examiner*—Loha Ben
*Assistant Examiner*—John Juba, Jr.
*Attorney, Agent, or Firm*—Morrison & Foerster

[57] ABSTRACT

A hyper-resolution optical device which can focus a beam of light to a diameter less than the diffraction limit. The optical device has an optical system disposed on a transmissive substrate. One component in the optical system is a hyper-resolution optical component which passes or reflects light and which has a central portion which does not pass or reflect light, respectively. The hyper-resolution optical component can be integrated with the transmissive substrate. Such optical devices are particularly suitable for optical pick-up devices, laser printers, sensors.

4 Claims, 5 Drawing Sheets

HYPERRESOLUTION OPTICAL SYSTEM

This application is a continuation-in-part of application Ser. No. 07/922,871, filed Jul. 31, 1991 now abandoned.

BACKGROUND OF THE INVENTION

1. Field of the Invention

The present invention relates to an optical device of a small size. More particularly, the present invention relates to an optical device miniaturized by allowing light to operate in a confined small space. Such optical devices are particularly suitable for optical pick-up devices, laser printers, and sensors, which require little space and light weight. In general, the optical device has two types; an integrated type and a substrate type.

2. Description of the Prior Art

In recent years, various kinds of optical information processors have been developed. Typical examples are compact disks that are widely used instead of gramophone records, electronic filing systems for storing documents and photographs in magneto-optical disks, and laser printers for writing information in a recording section of a copying machine with a laser beam. An optical information processor is also used in automated manufacturing equipment as an optical encoder and an optical range finder.

For example, a compact disk system is provided with pits having a depth of about ¼ wavelength which are intended to indicate digital signals "1" and "0". By reading data in terms of the pits the data is reproduced on a phonograph record.

The pit data is optically read so that large spaces are not required for one bit data but only a tiny area of about 1 $\mu m^2$ is sufficient. This leads to a highly dense recording system. Because of this advantage, compact disks are becoming more popular than magnetic tapes or magnetic disks.

The compact disk requires an optical component such as a pick-up device for reading pit data. The optical components include a lens, a beam splitter and other components, and the assemblage and adjustment of these are time- and labor-consuming. In addition, the size is likely to become large and heavy, and the cost is likely to be high.

Figure 5:
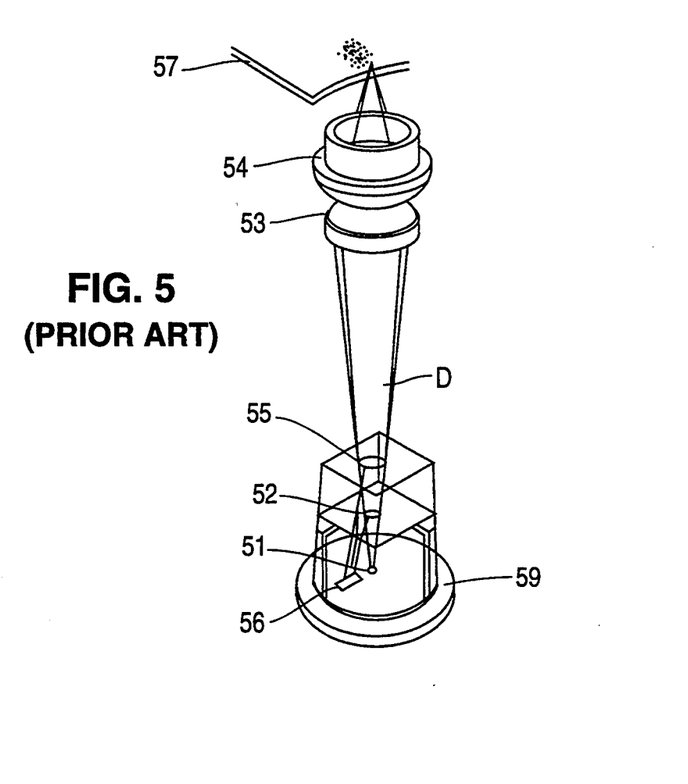
FIG. 5 is a perspective view showing an optical pick-up device using a conventional hologram.

In order to explain the background in more detail, reference will be made to FIG. 5 which shows a known optical pick-up device intended to overcome the problems mentioned above. This optical device is a self-contained system 59 which includes a hologram 55 formed on a glass plate 52 so as to enable it to function as a beam splitter and a diffracting grating, a semiconductor laser 51 as an optical source and an optical detector 56 for detecting signals. The pick-up device is operated as follows:

A laser beam D emitted upward from the semiconductor laser 51 is focused on an optical disk 57 through a collimator lens 53 and a focusing lens 54 both disposed above the hologram 55. The light reflecting from the disk 57 reversely follows the above-mentioned path but is deflected by the hologram 55, the light being detected by the detector 56. The focusing lens 54 is adjusted as to its position and focal point by means of an actuator (not shown) using an electro-magnet.

This known pick-up device is comparatively lightweight because of a reduced number of components as well as a reduced size of each component, but ideally, the desired weight should be much lighter. Among the components, it is only the focusing lens 54 that can be moved by the actuator because of its light weight.

Figure 6:
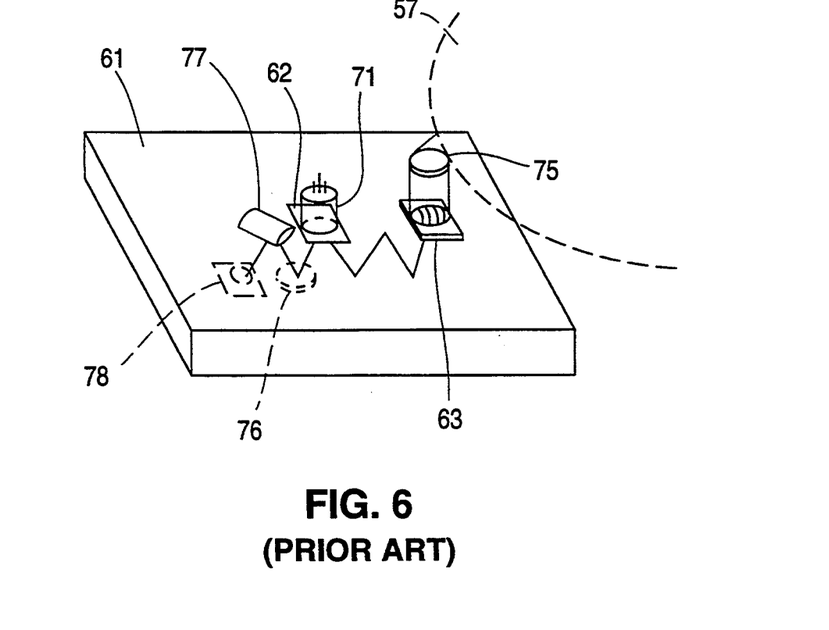
FIG. 6 is a perspective view showing a conventional substrate type optical pick-up device.

FIG. 6 shows another pick-up device designed to solve the problems pointed out above. A typical example of this device is disclosed in Japanese Laid-Open Patent Publication No. 62-117150. A three beam generating grating 62, a collimator diffracting grating 63, astigmatism generating lenses 76 and 77, a semiconductor laser 71 and an optical detector 78 are all mounted on a glass plate, except for a focusing lens 75 for focusing a source light on the disk 57.

This arrangement can dispense with any optical adjustment between one component and other. There is little possibility of causing displacement or deflection due to mechanical vibration or shock. This type of pick-up device will be referred to as "substrate type pick-up".

A substrate type pick-up device can be smaller in size than an ordinary pick-up device because the source light is propagated through the substrate 61 even though the distance between the light source and optical disk 57 is the same.

However, the small pick-up device requires the laser beam to be as small as possible in diameter so as to pass through the focusing lens without divergence. As a result, the advantage of the small size is traded off against the necessity for requiring a highly precision focusing lens 75. The focusing lens 75 is not mounted on the substrate 61 which prevents the size of the pick-up device from being reduced beyond a certain limit.

In order to make most use of the characteristics of light, the beam must be sufficiently focused on the optical disk 57. The minimum radius $W_0$ of the beam focused by an ordinary lens, the numerical aperture NA of the lens and the wavelength $\lambda$ of the beam are in the following relationship:

$$W_0 = \lambda/NA \quad (1)$$

The numerical aperture NA is nearly equal to d/2f where d is the smaller of the diameter of the lens or the diameter of the laser beam (i.e. the effective diameter of the lens), and f is the focal length of the lens. The minimum diameter $2W_0$ of the beam is called "diffraction limit".

If a lens has a larger numerical aperture NA, the beam can be focused smaller but this results in more aberration and difficulty in fabrication. If the device is to be made compact, the diameter of the beam must be reduced, but in order to maintain the numerical aperture NA constant, the focal length must be reduced. This requires the lens face to have a small curvature, but it is likely to cause aberration. Since a substrate type pick-up device has a relatively short distance from the light source to the focusing lens 75, the effective diameter of the focusing lens 75 can be relatively small. As a result, it is difficult to produce focusing lenses having a large numerical aperture NA.

Any other optical systems such as hologram laser printers cannot be miniaturized without sacrificing the focusability of the lens. The reduction in the focusability restricts the range of application.

In order to focus a light beam to below the minimum diameter decided by the numerical aperture NA of the lens, another method is proposed which consists of blocking light from passing through a central portion of the focusing lens 75. According to this method, the light beams passing through the peripheral portion of the lens are focused, thereby intensifying the secondary peaks appearing on both sides of the primary peak on the disk 57. The primary peak becomes narrower than when the light passing through the central portion is not blocked. This means that the light beam is focused beyond the minimum diameter of the beam determined by the numerical aperture NA of the lens. This phenomenon is called "hyperresolution effect", and such lenses are called "hyperresolution lenses".

Under a known system a hyper-resolution lens is disposed separately from the optical pick-up system. This necessitates the movement of the lens in accordance with that of the pits in the optical disk 57. Because of this movement, the light beam is likely to deviate from the central portion of the lens, thereby failing to achieve the desired focusing characteristics.

As is evident from the foregoing description, a light beam cannot be focused beyond a certain limit, thereby making it difficult to achieve a miniaturized optical pick-up device.

SUMMARY OF THE INVENTION

The optical device of this invention includes an optical system of mutually interlocked optical components including a light source, a lens, a beam splitter, a reflecting mirror, and an optical detector, the optical system being disposed in the path of light, one of the optical components which allows a light beam from the light source to pass or reflect comprising a central portion where the light beam is not passed or reflected.

According to another aspect of the present invention, the optical device includes an optical system of mutually interlocked optical components including a light source, a lens, a beam splitter, a reflecting mirror, and an optical detector, the optical system being disposed in the path of light, one of the optical components which allows a light beam from the light source to pass or reflect comprising a central portion which differentiates the optical characteristics of a light beam passing through the central portion from those of a light beam passing through the peripheral portion thereof.

According to a further aspect of the present invention, the optical device includes a light transmissive substrate, an optical system of mutually interlocked optical components including a light source, a lens, a beam splitter, a reflecting mirror, and an optical detector disposed in the path of light on the substrate, one of the optical components which allows a light beam from the light source to pass or reflect comprising a central portion where the light beam is not passed or reflected.

According to another aspect of the present invention, the optical device includes a light transmissive substrate, an optical system of mutually interlocked optical components including a light source, a lens, a beam splitter, a reflecting mirror, and an optical detector disposed in the path of light on the substrate, one of the optical components which allows a light beam from the light source to pass or reflect comprising a central portion which differentiates the optical characteristics of a light beam passing through the central portion from those of a light beam passing through a peripheral portion.

According to a further aspect of the present invention, the optical device includes a light transmissive substrate, an optical system of mutually interlocked optical components including a lens, a beam splitter, a reflecting mirror, and an optical detector disposed in the path of light on the substrate, one of the optical components which allows a light beam from outside to pass or reflect comprising a central portion where the light beam is not passed or reflected.

According to another aspect of the present invention, the optical device includes a light transmissive substrate, an optical system of mutually interlocked optical components including a lens, a beam splitter, a reflecting mirror, and an optical detector disposed in the path of light on the substrate, one of the optical components which allows a light beam from outside to pass or reflect comprising a central portion which differentiates the optical characteristics of a light beam passing through the central portion from those of a light beam passing through the peripheral portion thereof.

Thus, the invention described herein makes possible the advantages of (1) providing an optical device miniaturized without sacrificing optical characteristics, and (2) providing an optical device allowing the integration of optical components in a relatively small space.

These and other advantages of the present invention will become apparent to those skilled in the art upon reading and understanding the following detailed description with reference to the accompanying figures.

DESCRIPTION OF THE PREFERRED EMBODIMENTS

Example 1

Figure 1:
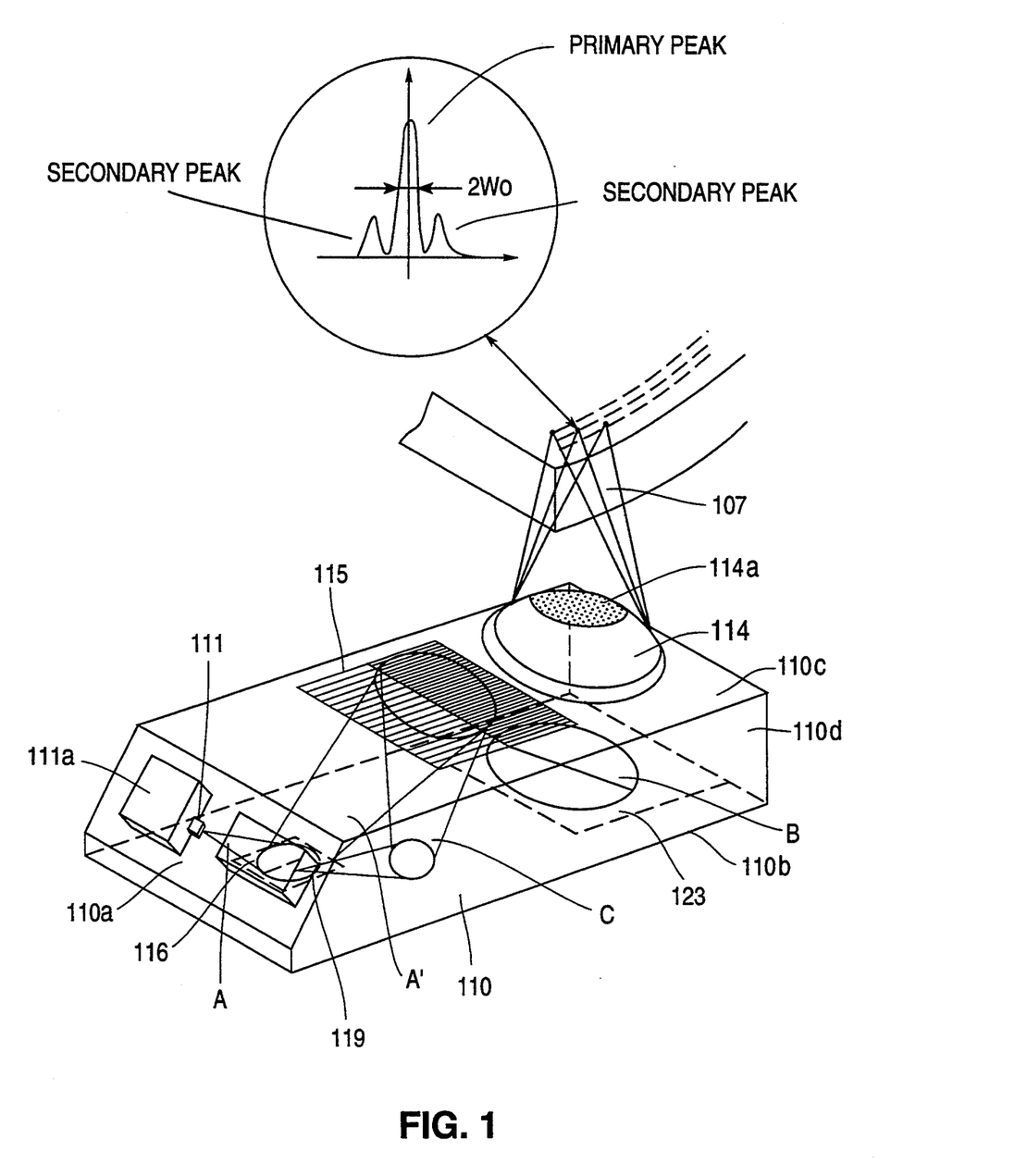
FIG. 1 is a perspective view showing an optical pick-up device to which a substrate type optical device according to the present invention is applied.

Referring to FIG. 1, the exemplary embodiment is a substrate type optical pick-up device which has a multi-sided substrate 110 of transparent glass. The substrate 110 includes an optical system including optical components.

The substrate 110 has an inclined face 110a at one end on which a semiconductor laser 111 is disposed as a light source to which a submount 111a made of a silicon substrate having an integrated semiconductor laser driving circuit (not shown) is connected. The semiconductor laser 111 and submount 111a are integrated with the inclined face 110a. A light beam A from the semiconductor laser 111 enters the substrate 110, and is injected into a diffracting grating 119. The light beam A is split into three beams A' having different angles of reflection $\phi$. The three beams A' are injected into a diffracting grating 115 formed on the top surface 110c of the substrate 110, the diffraction grating 115 including two kinds of hologram beam splitters having different grating period. The diffraction grating 115 splits the light beams A' into a light beam reflected therefrom and diffracted light beams which are not used in Example 1.

The light beams reflected from the diffraction grating 115 are diffracted vertically upwards by a diffraction grating 123 formed on the bottom 110b and converted into parallel light beams B. The parallel beams B are focused by a hyper-resolution lens 114 integral with a portion of the substrate 110 corresponding to the diffraction grating 123 whereby they are focused on an optical disk 107. The hyper-resolution lens 114 is formed by depositing an aluminum film 114a around the center of an aspheric lens. In addition, it is preferable that the aluminum depositing portion 114a is roughened by a chemical etching so as to prevent the reflecting light beam from returning to the semiconductor laser 111.

Circled in FIG. 1 is an enlarged view which shows the distribution of optical intensity possessed by each spot on the optical disk 107, and according to the hyper-resolution lens 114, the diameter $2W_0$ of the beam can be reduced by 70% than when an ordinary lens is used. As shown by the enlarged view, each optical spot includes two secondary peaks which appear on each side of a primary peak.

The light beam reflecting from the optical disk 107 passed through the hyper-resolution lens 114 and is converted into parallel light beams. Then, they are split into a diffracted light beam C and a reflected light beam by the diffracting grating 115. In the illustrated example, this reflected light is not used.

The diffracted light beam C is injected into a sextant detector 116 formed on the inclined face 110a of the substrate 110 which is formed adjacent to the semiconductor laser 111 so as to detect signals, a focal point, and the positions of pits. Part of the secondary-peaked reflected light beams results in noise but the noise is not so strong as a signal which would be caused by the primary peak, thereby providing no problem in detection.

The hyper-resolution lens 114 is not limited to the structure described above, but other structures can be selected; for example, a central portion of the aspheric lens is flattened to negate the focusability of this central portion. Alternatively, it is possible to deposit a highly reflective film such as an aluminum film on the flat portion so as to produce a flat mirror.

Light beams which are not focused on the optical disk 107 return to the semiconductor laser 111, and part of it enters the sextant detector 116. The reflected light beams are constant irrespective of the movement of the optical disk 107, and it results in the overlapping of d.c. bias components in the sextant detector 116 so that no unfavorable influence is inflicted on the detection of signals. These reflected light beams constitute an external resonator whereby the optical intensity of the semiconductor laser is made constant regardless of any variation in the reflected light.

A hyper-resolution effect can be achieved by methods other than by using the hyper-resolution lens 114; for example, by not forming the diffraction grating 123 around the central portion of the substrate 110, a different optical property is imparted to this portion from that of the other portion. Alternatively, such an effect can be achieved by imparting a different optical property to the central portion from that of the peripheral portion of any other optical component apart from the diffraction grating. In this case, an incident light to this portion cannot be used as a signal. Because of the absence of the diffraction grating 123, the incident light to this portion passes from the bottom 110b through the substrate 110. Alternatively, it reflects and passes through the substrate 110 from the opposite side 110d. No unfavorable influence is inflicted on the characteristics of this optical pick-up device.

The substrate type pick-up device is usable not only for compact disk systems but also for magneto-optical disk systems. In the latter application, it is required that a polarizer such as a Glan-Thompson prism, a polarizing beam splitter, a deep-groove diffracting grating, and a birefringence crystal is disposed individually or integrated in the substrate 110.

Figure 4:
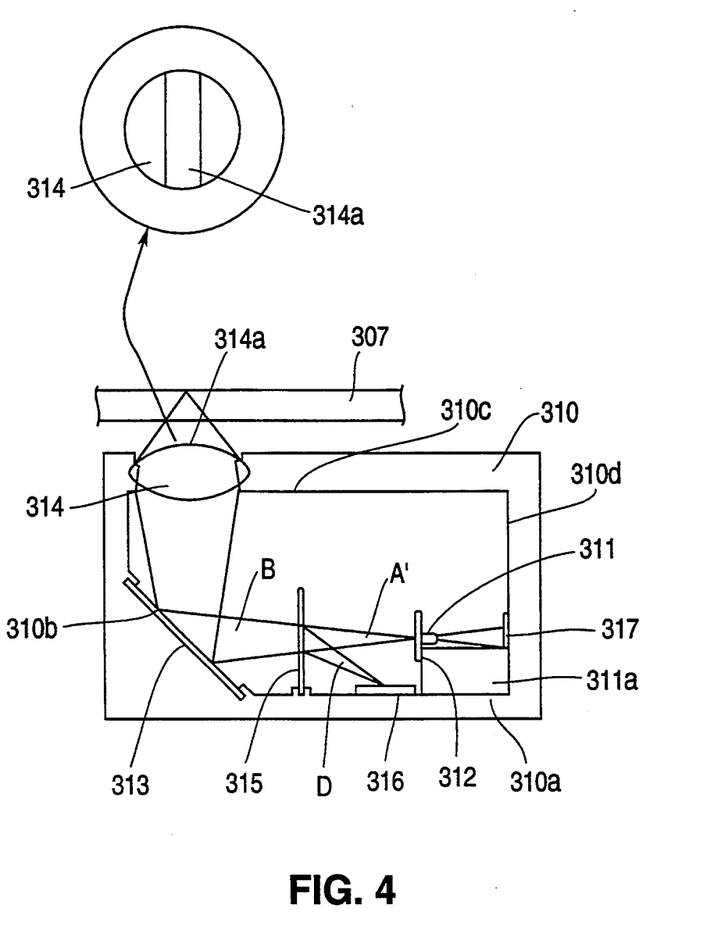
FIG. 4 is a side view showing a pick-up device to which an optical device according to the present invention is applied.

The pattern 114a deposited on the hyperresolution lens 114 is not necessarily required to be circular but may be rectangular as shown in FIG. 4 as reference numerals 314 and 314a. This is because restraint is loose upon resolution in a direction normal to the pit pattern on the optical disk. The longitudinal direction of the rectangular pattern depends upon relative directions of the pits and substrate 110, and therefore the relationship therebetween is not limited to the illustrated example.

Example 2

Figure 2:
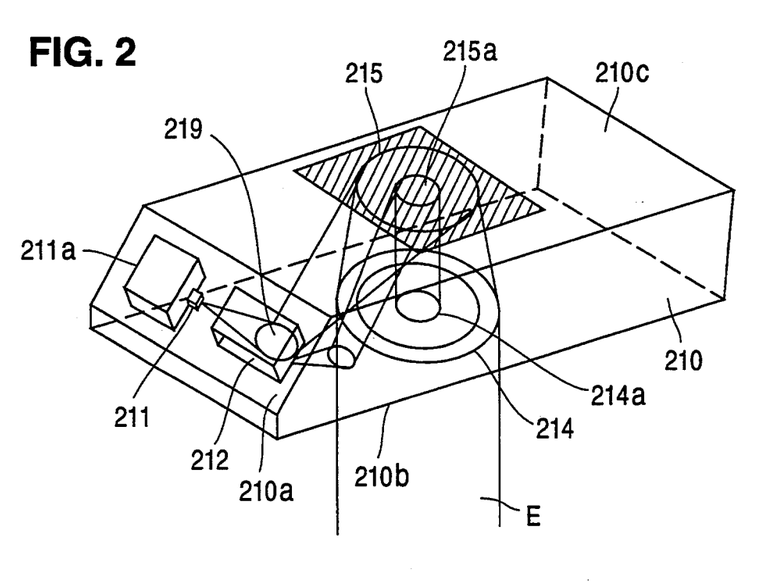
FIG. 2 is a perspective view showing a hologram laser printer having a light source to which a substrate type optical device according to the present invention is applied.

Referring to FIG. 2, the exemplary embodiment is a substrate type optical device which is applied to a light source of a hologram laser printer.

The exemplary embodiment has the following structure and operation:

A substrate 210 has the same multi-sided shape as that of Example 1. A semiconductor laser 211 and a submount 211a are mounted on an inclined face 210a. Light beams from the semiconductor laser 211 are injected into the substrate 210, and reflected upon the bottom 210b. Then, they are injected into a collimator 215 which also functions as hologram for correcting aberration, the collimator 215 being located in a middle portion in the longitudinal direction of the top surface 210c of the substrate 210.

The light beams are reflected from the collimator 215 and become parallel which are then converted into concentric light beams E and radiated outside through a circular aperture 214 formed in the bottom 210b of the substrate 210. The reference numeral 214a denotes a reflecting mirror which is concentrically formed by depositing highly reflective metal such as aluminum on the substrate 210. After being reflected from the reflecting mirror 214a, the light beams are diffracted by the diffracting grating 215a and injected into an optical detector 212 mounted adjacent to the semiconductor laser 211. The result of detection is used to monitor the output of the semiconductor laser 211.

Figure 3:
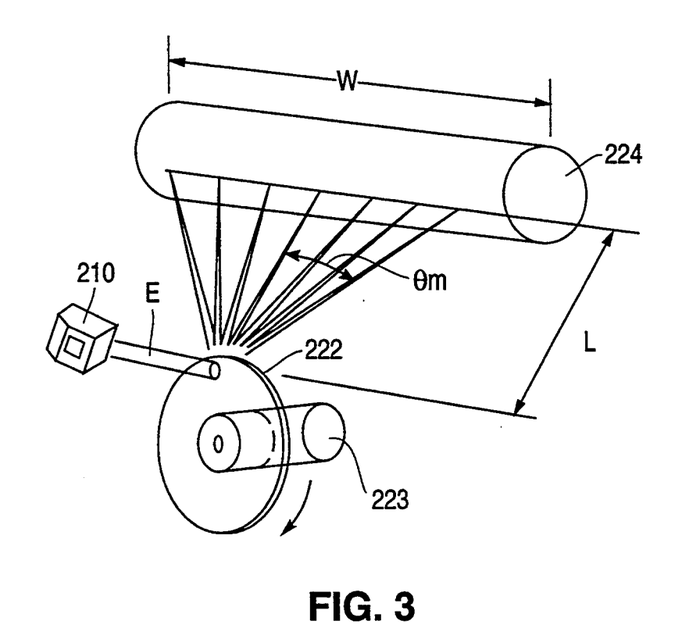
FIG. 3 is a perspective view showing a hologram laser printer using a substrate type optical device according to the present invention.

Now, the system using a hologram laser printer will be described:

There is provided a rotary polygonal hologram deflector 222, hereinafter referred to as "deflector", at a place where the light beams E are irradiated. As shown in FIG. 3, after being deflected by the deflector 222, the light beams are focused on a photoelectric drum 224. Each spot produced by the light beams has a primary peak in the center and secondary peaks on either side thereof having a reduced diameter $2W_0$ just like those shown in FIG. 1, which is achieved because the incident light beams E are concentric.

The photoelectric drum 224 is coated with a photosensitive agent having a threshold characteristic of being sensitive to the primary peak and not being sensitive to the secondary peaks, thereby preventing the unfavorable influence from occurring by the secondary peaks.

The spots form an electrostatic latent image on the photoelectric drum 224. Toner is supplied to the latent image, and a toner image is transferred to a recording sheet. The photoelectric drum 224 is scanned by rotating the hologram section by means of a motor 223.

This embodiment has advantages over known hologram laser printers which will be described by reference to FIG. 7:

The known hologram laser printers include a semiconductor laser 231, an aberration correcting hologram 232 functioning as a collimator. The laser beams emitted by the semiconductor laser 231 are made parallel by the aberration correcting hologram 232, and injected into the deflector 233 whereby the light beams are deflected and focused on a photoelectric drum 234. Then the same procedure as that mentioned above are followed. In this way a toner image is transferred on a recording sheet. The aberration correcting hologram 232 corrects aberration caused by the deflector 233.

The size of the laser printer depends upon the distance L between the deflector 233 and the photoelectric drum 234, wherein the distance L can be determined by adjusting the size of a light beam which scans the photoelectric drum 234. The deflector 233 must deflect the light beams as linearly as possible, and the linear limitation determines the maximum deflecting angle $\theta m$.

Figure 7:
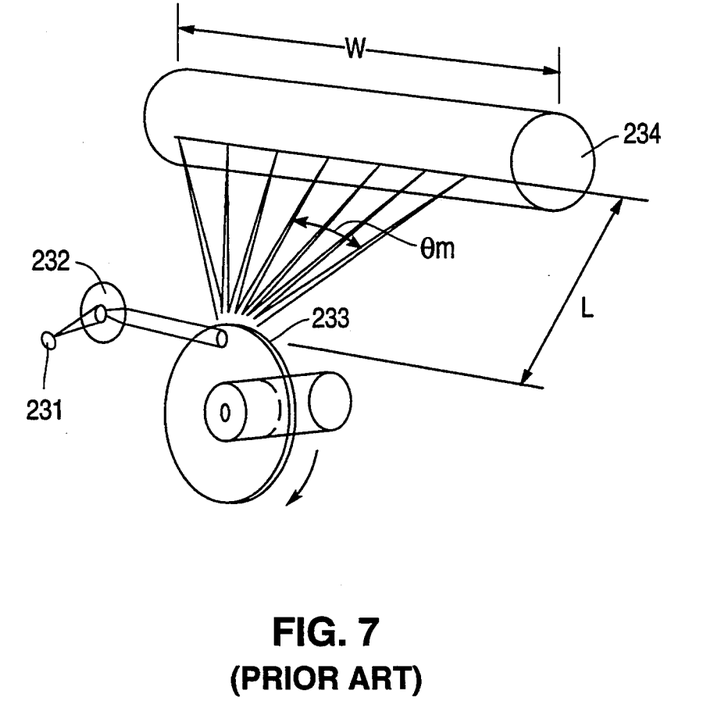
FIG. 7 is a perspective view showing a laser printer using a conventional hologram.

The geometric relationship shown in FIG. 7 can be expressed by the following equation (2):

$$L = w/(2 \cdot \tan \theta m) \qquad (2)$$

where w is a supposed maximum width of a recording paper.

In the equation (2) w is ordinarily not larger than 30 cm, $\theta m$ is about 30°, and L is about 30 cm.

The equation (1), i.e. $W_0 = \lambda/NA$ must also apply to the conventional laser printer shown in FIG. 7 where $W_0$ is the radius of each focused spot and d is a diameter of a light beam on the aberration correcting hologram 232. Now, suppose that $W_0$ is 25 μm and λ is 780 nm, NA must be about 0.03. Then d will be greater than 19 mm for L=300 mm. Such a large figure means that the flattening of the deflector is possible but the integrating of optical elements is impossible. On the other hand, if it is required that the distance L is large enough to miniaturize the size of the aberration correcting hologram 232. The size can easily be reduced by bending an optical path by means of flat mirrors but this method requires a complicated structure. In addition, a highly precise optical device is required so as to focus light beams up to the extremity of diffraction. After all, it is difficult to miniaturize the optical device under the known system so long as the optical system must satisfy the equation (1).

According to the present invention, the concentric incident light can advantageously reduce the diameter of the light beams smaller than when ordinary light beams are used. The secondary peaks are prevented from producing unfavorable influences.

In Example 2 the concentric aperture 214 is used, but a collimator can also be used.

Example 3

Referring to FIG. 4, the exemplary embodiment is an integrated type which includes a multi-sided housing and an optical system having the following structure:

A semiconductor laser 311 is mounted as a light source on the bottom 310a of the housing 310 through a submount 311a of copper. The output of the semiconductor laser 311 is monitored by an optical detector 317 disposed on a side 310d of the housing 310 so as to control the current so that the output is constantly maintained. The light beams from the semiconductor laser 311 are injected into the diffracting grating 312 disposed immediately before the semiconductor laser 311.

The diffracting grating 312 propagates three light beams A' having different outgoing angles with respect to the incident angle. Then the light beams A' are injected into a diffracting grating 315 disposed on the bottom 310a of the housing 310. The diffracting grating 315 including two types of hologram beam splitters having different grating period splits the incident light beams into a transmitted light beam B and diffracted light beams which are not used in Example 3.

The transmitted light beam B is reflected upwards by the reflecting mirror 313 disposed on an inclined surface 310b of the housing 310. Then, the light beam is focused on the optical disk 307 by the hyper-resolution lens 314 mounted on a top surface 310c of the housing 310. This hyper-resolution lens 314 is made of an ordinary aspheric lens which has a thin film of aluminum 314a around the central portion.

The light reflected from the optical disk 307 passes through the hyper-resolution lens 314, and is reflected from the reflecting mirror 313. Then, the light beams are split into a diffracted light D and a transmitted light which is not used in Example 3. The diffracted light D is injected into a sextant detector 316 disposed on the bottom 310a of the housing 310. The sextant detector 316 generates signals for controlling the optical components, and signals stored in the optical disk 307. The optical components within the housing 310 are driven as a whole by a magnetic actuator, and are controlled so as to ensure that the light spots on the optical disk 307 may not be displaced from the signal pits.

In Example 3 the use of a hyper-resolution lens 314 can miniaturize the housing 310, thereby resulting in a compact optical device. The miniaturized optical device ensures a quick response speed and precise control only by use of a magnetic actuator.

The application of the present invention is not limited to an optical pick-up device (Examples 1 and 3) and a light source for a hologram laser printer (Example 2) but it can be applied to any other optical devices such as optical range finders and optical sensors. When it is applied to an optical sensor, it is not necessary to provide a light source in the substrate by using a detecting system in which the light is taken from outside.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical device comprising a light transmissive substrate, an optical system of optical components including a light source, a lens, a beam splitter, a reflecting mirror and an optical detector disposed in the path of light on the substrate, said light transmissive substrate having upper and lower surfaces, two side surfaces, and two end surfaces, wherein one end surface is inclined with respect to the upper and lower surfaces, said light source and said optical detector being disposed on said inclined surface;

wherein one of the optical components is an objective lens having at least one aspheric surface, said objective lens being integrated with the transmissive substrate for passing a light beam from the light source so as to irradiate an objective in the outside of the optical system, and wherein said objective lens is a hyperresolution lens comprising a central portion of the aspheric surface where the light beam is not passed or reflected respectively.

2. An optical device comprising a light transmissive substrate, an optical system of optical components including a light source, a lens, a beam splitter, a reflecting mirror and an optical detector disposed in the path of light on the substrate, said light transmissive substrate having upper and lower surfaces, two side surfaces, and two end surfaces, wherein one end surface is including with respect to the upper and lower surfaces, said light source and said optical detector being disposed on said inclined surface;

wherein one of the optical components is an objective lens having at least one aspheric surface, said objective lens being integrated with the transmissive substrate for passing a light beam from the light source so as to irradiate an objective in the outside of the optical system, and wherein said objective lens is a hyperresolution lens comprising a central portion of the aspheric surface which differentiates the optical characteristics of a light beam passing through the central portion from those of a light beam passing through a peripheral portion thereof.

3. An optical device comprising a light transmissive substrate, an optical system of optical components including a lens, a beam splitter, a reflecting mirror and an optical detector disposed in the path of light on the substrate, said light transmissive substrate having upper and lower surfaces, two side surfaces, and two end surfaces, wherein one end surface is inclined with respect to the upper and lower surfaces, said light source and said optical detector being disposed on said inclined surface;

wherein one of the optical components is an objective lens having at least one aspheric surface, said objective lens being integrated with the transmissive substrate for passing a light beam from the outside of the optical system so as to make the light beam incident upon another one of the optical components, and wherein said objective lens is a hyperresolution lens comprising a central portion of the aspheric surface where the light beam is not passed or reflected respectively.

4. An optical device comprising a light transmissive substrate, an optical system of optical components including a lens, a beam splitter, a reflecting mirror and an optical detector disposed in the path of light on the substrate, said light transmissive substrate having upper and lower surfaces, two side surfaces, and two end surfaces, wherein one end surface is inclined with respect to the upper and lower surfaces, said light source and said optical detector being disposed on said inclined surface;

wherein one of the optical components is an objective lens having at least one aspheric surface, said objective lens being integrated with the transmissive substrate for passing a light beam from the outside of the optical system so as to make the light beam incident upon another one of the optical components, and wherein said objective lens is a hyper-resolution lens comprising a central portion of the aspheric surface which differentiates the optical characteristics of a light beam passing through the central portion from those of a light beam passing through a peripheral portion thereof.

* * * * *

UNITED STATES PATENT AND TRADEMARK OFFICE
CERTIFICATE OF CORRECTION

PATENT NO. : 5,450,237
DATED : September 12, 1995
INVENTOR(S) : Toshihiko Yoshida, Osamu Yamamoto, Saburo Yamamoto, Shohichi Kato, Masumi Nakamichi, Toshimasa Hamada, Sadayoshi Matsui It is certified that error appears in the above-indentified patent and that said Letters Patent is hereby corrected as shown below:

In column 1, line 4, please change "continuation-in-part" to -- continuation --.

In column 9, line 19, please change "including" to -- inclined --.

In column 10, line 34, please change "hyper-resolution" to -- hyperresolution --.

Signed and Sealed this

Twentieth Day of February, 1996

Attest:

BRUCE LEHMAN

*Attesting Officer*     *Commissioner of Patents and Trademarks*